United States Patent
Seshadri et al.

(10) Patent No.: US 9,282,137 B2
(45) Date of Patent: Mar. 8, 2016

(54) DYNAMIC PACKAGE CREATION FOR PREDICTIVE PAGE LOAD OPTIMIZATION

(71) Applicant: Microsoft Corporation, Redmond, WA (US)

(72) Inventors: Aravind Krishnamachari Seshadri, Redmond, WA (US); Patrick Plaisted, Redmond, WA (US); Johannes Klein, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 419 days.

(21) Appl. No.: 13/831,844

(22) Filed: Mar. 15, 2013

(65) Prior Publication Data

US 2013/0318208 A1    Nov. 28, 2013

Related U.S. Application Data

(63) Continuation-in-part of application No. 13/480,498, filed on May 25, 2012, now Pat. No. 8,892,684.

(51) Int. Cl.
    G06F 15/16    (2006.01)
    H04L 29/08    (2006.01)
    G06F 17/30    (2006.01)

(52) U.S. Cl.
    CPC .......... *H04L 67/02* (2013.01); *G06F 17/30899* (2013.01); *H04L 67/2828* (2013.01); *H04L 67/2871* (2013.01)

(58) Field of Classification Search
    USPC .................................. 709/217, 225, 226, 229
    See application file for complete search history.

(56) References Cited

U.S. PATENT DOCUMENTS

| | | | |
|---|---|---|---|
| 7,395,355 B2 | 7/2008 | Afergan et al. | |
| 7,937,478 B2 | 5/2011 | Cheng et al. | |
| 7,975,071 B2 | 7/2011 | Ramjee et al. | |
| 8,060,613 B2 | 11/2011 | Farber et al. | |
| 8,326,955 B2* | 12/2012 | Airo et al. | 709/222 |
| 2002/0016828 A1 | 2/2002 | Daugherty et al. | |
| 2002/0099829 A1* | 7/2002 | Richards et al. | 709/227 |
| 2007/0271385 A1 | 11/2007 | Davis et al. | |
| 2008/0065745 A1 | 3/2008 | Leighton et al. | |
| 2010/0312821 A1 | 12/2010 | Bannoura et al. | |
| 2012/0226766 A1 | 9/2012 | Fainberg et al. | |

(Continued)

OTHER PUBLICATIONS

"Office Action Issued in U.S. Appl. No. 13/480,498", Mailed Date: Apr. 28, 2014, Filed Date: May 25, 2012, 6 Pages.

(Continued)

*Primary Examiner* — Liangchea Wang
(74) *Attorney, Agent, or Firm* — Judy Yee; Micky Minhas (57) ABSTRACT

Embodiments optimize web page downloads through a customized manifest to reduce latency and network data consumption. A proxy device creates or selects a pre-defined manifest identifying page resources associated with the web page. The manifest is customized by identifying the page resources already cached on a computing device. A single package of resources representing the web page is created. The single package of resources excludes the identified page resources already cached on the computing device. The computing device renders the web page using the single package and the page resources already cached. Some embodiments perform web crawling to create manifests for other web pages.

20 Claims, 8 Drawing Sheets

(56) References Cited

U.S. PATENT DOCUMENTS

2012/0254720 A1 10/2012 Hamm et al.
2012/0284239 A1* 11/2012 Agarwala et al. ............. 707/693

OTHER PUBLICATIONS

"Notice of Allowance Issued in U.S. Appl. No. 13/480,498", Mailed Date: Jul. 22, 2014, Filed Date: May 25, 2012, 13 Pages.
Dong, et al., "Proxy-based Object Packaging and Compression: A Web Acceleration Scheme for UMTS", Retrieved at <<http://ieeexplore.ieee.org/stamp/stamp.jsp?tp=&arnumber=5303682>>, In the proceeding of 5th International Conference on Wireless Communications, Networking and Mobile Computing, Sep. 24, 2009, pp. 5.
Armstrong, Nicholas D. R., "Just-In-Time Push Prefetching: Accelerating the Mobile Web", Retrieved at <<http://www.uwspace.uwaterloo.ca/bitstream/10012/6256/1/Armstrong_Nicholas.pdf>>, In the Theses and Dissertations of Faculty of Engineering, Mar. 11, 2011, pp. 103.

"Riverbed Stingray Product Family", Retrieved at <<http://www.riverbed.com/assets/media/documents/brochures/ProductBrochure_Stingray_Product_Family.pdf>>, Retrieved Date: Nov. 20, 2012, pp. 8.
Darragh, Jim., "Comment: Preparing for website traffic peaks", Retrieved at <<http://www.retail-week.com/comment/efashion-blog/comment-preparing-for-website-traffic-peaks/5037443.article>>, Jun. 20, 2012, pp. 2.
Anderson, Rick., "Bundling and Minification", Retrieved at <<http://www.asp.net/mvc/tutorials/mvc-4/bundling-and-minification>>, Aug. 23, 2012, pp. 10.
"Optimize caching", Retrieved at<<https://developers.google.com/speed/docs/best-practices/caching>>, Retrieved Date: Nov. 20, 2012, pp. 4.
Balliauw, Maarten, "Using the Windows Azure Content Delivery Network", Retrieved at <<http://acloudyplace.com/2012/04/using-the-windows-azure-content-delivery-network/>>, Apr. 5, 2012, pp. 6.

* cited by examiner

DYNAMIC PACKAGE CREATION FOR PREDICTIVE PAGE LOAD OPTIMIZATION

CROSS-REFERENCE TO RELATED APPLICATION

This application is a continuation-in-part of prior U.S. patent application Ser. No. 13/480,498, filed May 25, 2012, the entirety of which is incorporated by reference herein.

BACKGROUND

Complex web pages are often assembled dynamically at a client by having the client fetch multiple resources from multiple endpoints. This results in high latencies, increased network data consumption, and sometimes frustrating and disjointed page rendering experiences. While some existing systems offer the delivery of pre-packaged content by combining multiple resources to reduce downloads from the endpoints in a package, these systems rely on static packaging which has several downsides. For example, static packages often lead to "over push" conditions where the client either has to download a package that contains some resources that are already present with the client, or has to fetch additional resources from origin sites. In both of these examples, the client has to download additional network data.

Further, at least because each client has different configurations and states, there is no one optimal static package for every client. For example, static packages may differ according to the type of resources in the web page, time (e.g., include resources that changed recently in one package and resources that have not changed recently in another package), the size of the resources (e.g., group the smaller resources together in one package), and the like. As such, any given static package may benefit some clients for some web pages, but does not benefit other clients for other web page.

SUMMARY

Embodiments of the disclosure optimize web page downloads with a customized manifest. In response to a request for a web page, a computing device receives, from a proxy device, a manifest identifying resources associated with the web page. The computing device modifies the manifest to identify those resources associated with the web page that are already cached by the computing device. The computing device sends the modified manifest to the proxy device. In response, the computing device receives, from the proxy device, a single package of resources that has been created based on the modified manifest. The single package excludes the identified resources associated with the web page that are already cached by the computing device. The computing device renders the web page using the single package in conjunction with the identified resources associated with the web page that are already cached by the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure optimize web page downloads using dynamic packaging of resources. Packaging places content together so that the content may be retrieved from a content delivery network (e.g., a CDN) 114 via a single hypertext transfer protocol (HTTP) request rather than sending several individual requests to download the same content from content sources. In some embodiments, a proxy device 104 creates or selects a manifest 326 (e.g., a pre-defined manifest) identifying page resources associated with a web page in response to a request for the web page from a computing device 102. The computing device 102 customizes the manifest 326 to identify one or more cached resources 112 available on the computing device 102. The proxy device 104 dynamically creates a single package of resources for the web page based on the customized manifest. The single package of resources excludes the identified cached resources 112.

Aspects of the disclosure reduce a quantity of network traffic (e.g. latency or bandwidth) consumed by the computing device 102 while rendering web pages. For example, network roundtrip communications and network data consumption are reduced, thereby reducing battery usage and processing on the computing device 102. Aspects of the disclosure further enable the computing device 102 to decide, based on the information in the manifest 326, which resources are to be provided to computing device 102 to render or otherwise display the web page.

In this manner, dynamic packaging eliminates the transmittal of data that is already present on the computing device 102 to render web pages, thus leading to decreased network data consumption. Further, large amounts of data may be compressed before transmittal to the computing device 102 which results in higher compression gain on overall network traffic when compared to compressing each resource separately. Dynamic packaging further allows initialization of a single decompression stream on the computing device 102 or other client instead of using multiple decompression streams. Thus, if a page resource 630 is not already compressed by an origin(s) site 116, the page resource 630 is compressed before being transmitted to the computing device 102.

In an example scenario, dynamic packaging of resources in a single package reduces page latency by eliminating queue time, wait time and transmission time of the HTTP requests by aggregating the requests into one or two HTTP requests.

Figure 1:
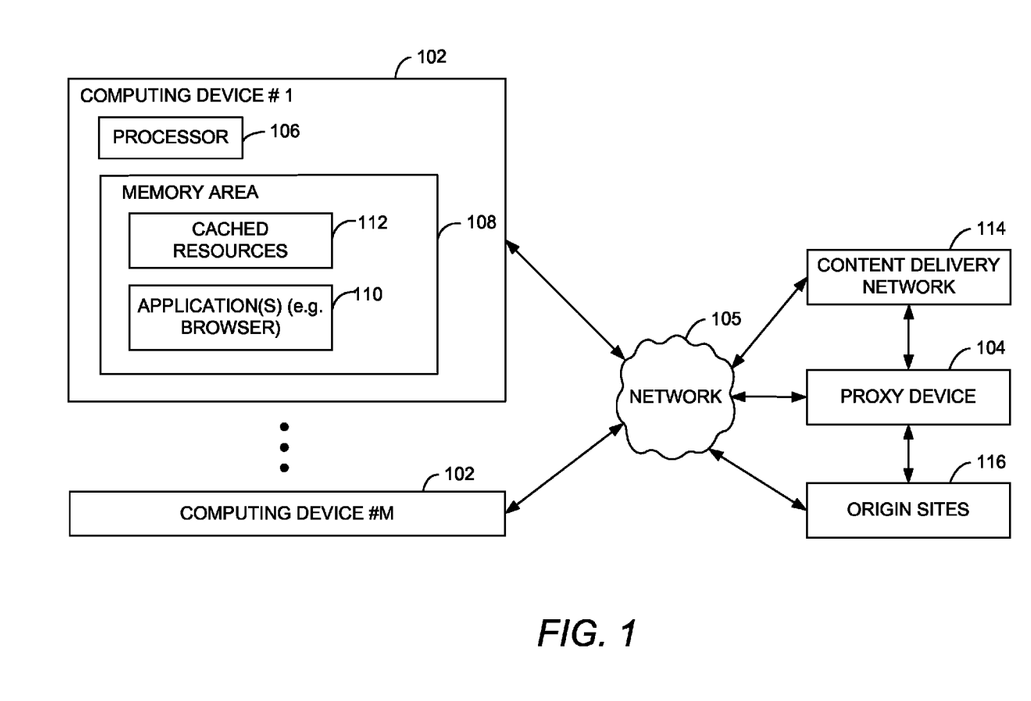
FIG. 1 is an exemplary block diagram illustrating a plurality of computing devices communicating with a proxy device.

Referring to FIG. 1, an exemplary block diagram illustrates a plurality of computing devices 102 communicating with the proxy device 104, the content delivery network 114 and origin sites 116 (or other content sources) for downloading web pages. The computing devices 102 include, for example, computing device #1 through computing device #M. The computing devices 102 represent any devices executing instructions (e.g., as application programs, operating system functionality, or both) to implement the operations and functionality associated with the computing devices 102. The computing devices 102 may include a mobile computing device or any other portable device. In some embodiments, the computing device 102 includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

In some embodiments, the computing device 102 has at least one processor 106 and a memory area 108. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2).

In some embodiments, the processor 106 represents an implementation of analog techniques to perform the operations described herein. For example, the operations may be performed by an analog computing device and/or a digital computing device.

The computing device 102 includes one or more computer readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown). In some embodiments, the memory area 108 includes read-only memory and/or memory wired into an analog computing device.

The memory area 108 stores, among other data, one or more applications 110. The applications 110, when executed by the processor 106, operate to perform functionality on the computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network 105. For example, the applications 110 may represent downloaded client-side applications that correspond to server-side services executing in the cloud.

The memory area 108 further stores a plurality of cached resources 112 that may be used when rendering the web page.

The computing devices 102 communicate with the proxy device 104 via the network 105. Exemplary networks 105 include wired and wireless networks. Exemplary wireless networks include one or more of wireless fidelity (Wi-Fi) networks, BLUETOOTH brand networks, cellular networks, and satellite networks. In some embodiments, the proxy device 104 is remote from the computing devices 102. In other embodiments, the proxy device 104 is local to the computing devices 102, or one of the computing devices 102.

Figure 2:
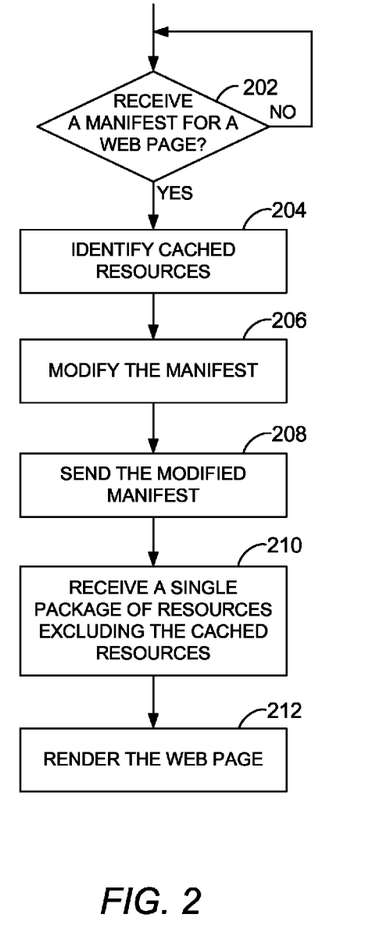
FIG. 2 is an exemplary flow chart illustrating operation of a computing device to download and render a web page.

Referring next to FIG. 2, an exemplary flow chart illustrates operation of the computing device 102 to download and render the web page. While the operations illustrated in FIG. 2 are described as being performed by the computing device 102 in some embodiments, the operations may be performed by any other computing entity such as a cloud service or a web service.

In the example shown in FIG. 2, one of the computing devices 102 sends a request for the web page to the proxy device 104. For example, a request for a resource associated with the web page may be sent. In other embodiments, the computing device 102 sends the request to one or more of the origin sites 116, and the request is either intercepted by the proxy device 104 or re-routed to the proxy device 104.

As further described with reference to FIG. 4, the proxy device 104 accesses or creates the manifest 326 associated with the requested web page, and transmits the manifest 326 to the computing device 102.

At 202, the computing device 102 checks whether the manifest 326 for the requested web page has been received in response to the request. The manifest 326 represents a description of the page resources 630 associated with the web page (e.g., which page resources are used to render the web page). In some embodiments, the manifest 326 is identified by a uniform resource locator (URL).

In some embodiments, the received manifest 326 is a new manifest created by the proxy device 104 in response to the request from the computing device 102. In other examples, the manifest 326 is predefined, created previously, and/or accessible by the proxy device 104 from one or more local or remote data stores.

At 204, the computing device 102 compares the cached resources 112 stored in the memory area 108 to the page resources in the manifest 326. At 206, the computing device 102 modifies the manifest 326 to identify the page resources that are stored in the memory area 108 as at least a portion of the cached resources 112. In some embodiments, the computing device 102 creates and/or maintains an inventory, catalog, or other identification of the resources available in the memory area 108 of the computing device 102. This may be done intermittently, periodically, regularly, or otherwise on an ongoing basis.

In some embodiments, identifying the resources associated with the web page that are cached by the computing device 102 comprises comparing timestamps, from the manifest 326, of the resources associated with the web page with timestamps, from the computing device 102, of the resources as cached by the computing device 102. In other embodiments, identifying those resources associated with the web page that are cached by the computing device 102 comprises comparing identifiers, from the manifest 326, of the resources associated with the web page with identifiers, from the computing device 102, of the resources as cached by the computing device 102.

In some embodiments, modifying the manifest 326 comprises tagging or flagging, in the manifest 326, those resources associated with the web page that are cached by the computing device 102. In other embodiments, the manifest 326 is modified by removing/deleting from the manifest 326 those resources associated with the web page that are cached by the computing device 102. For example, the manifest 326 may be modified by deleting one or more of the metadata, index, and/or identifiers associated with the cached resources 112. In other examples, the manifest 326 may be modified by setting a flag corresponding to the page resources that are stored in the memory area 108 as the cached resources 112.

In an alternative embodiment, the computing device 102 constructs an exclusion list and/or inclusion list to modify the manifest 326. For example, the computing device 102 creates an inclusive list or exclusive list based on the quantity of the cached resources 112 versus the quantity of resources identified in the manifest 326. For example, the exclusion list is constructed when the majority of resources in the manifest 326 are already cached on the computing device 102. The exclusion list and/or inclusion list include, for example, a comma-separated list of ranges. Each range identifies a resource in the version of the manifest 326 stored by the proxy device 104 as, for example, an offset into the resource list in that manifest 326.

The computing device 102 provides the modified manifest to the proxy device 104 at 208. For example, the modified manifest may be sent to the proxy device 104 by sending a single hypertext transfer protocol (HTTP) request for the web page.

As further described with reference to FIG. 4, the proxy device 104 creates a package of resources customized to the current cache state of the computing device 102. In some embodiments, the package is serialized to a byte array before being provided to the computing device 102.

Aspects of the disclosure are operable with the package in any format. In some embodiments, the package is formatted in multipurpose Internet mail extensions (MIME) format and using a message transmission optimization mechanism (MTOM). Appendix A provides an example of the package in MIME format. The proxy device 104 inserts resources in the package in any order. The proxy device 104 may order the resources to match the order of resources as identified the manifest 326. In other embodiments, the order of the resources in the package may be different than the order of the resources identified in the manifest 326. The proxy device 104 may provide the computing device 102 with metadata identifying the sequence of resources in the package.

In other embodiments, the proxy device 104 also provides metadata identifying the resources, associated with the web page, that are not cached by the computing device 102 yet have been excluded or otherwise omitted from the package. In an example, the package contains 10 resources associated with the web page. If two of these resources are not available to the proxy device 104 at the time the request for the package arrives, the proxy device 104 may use this metadata to indicate to the computing device 102 that the proxy device 104 is not able to include these resources. In such embodiments, the computing device 102 fetches the resources identified in the metadata from the origin sites 116 when attempting to render the web page. Alternatively or in addition, the computing device 102 may delay or block rendering of the web page until each of the resources have been received at some subsequent time (e.g., a second or two).

At 210, the computing device 102 receives, from the proxy device 104, the single, customized package of resources representing the web page. The single package of resources excludes the page resources 630, identified in the manifest 326, that are stored in the memory area 108 as the cached resources 112. The proxy device 104 generates the single package in response to receiving the modified manifest from the computing device 102. This dynamic packaging eliminates, prevents, and/or avoids pushing data already present on the computing device 102.

The computing device 102 renders the web page at 212 using the received single package of resources in combination with the page resources already stored in the memory area 108.

In an example embodiment, the manifest 326 for the requested web page may not be available or created on the proxy device 104. If the manifest 326 does not exist on the proxy device 104, then page resources associated with the web page are fetched by the computing device 102 from the content delivery network 114, the origin sites 116, and/or other content sources. In such scenarios, the computing device 102 generates a page report for the downloaded web page. The page report identifies the resources associated with the downloaded web page. The computing device 102 sends the page report to the proxy device 104. As further described and shown with reference to FIG. 5, the proxy device 104 creates the manifest 326 for the downloaded web page from the page report.

Figure 3:
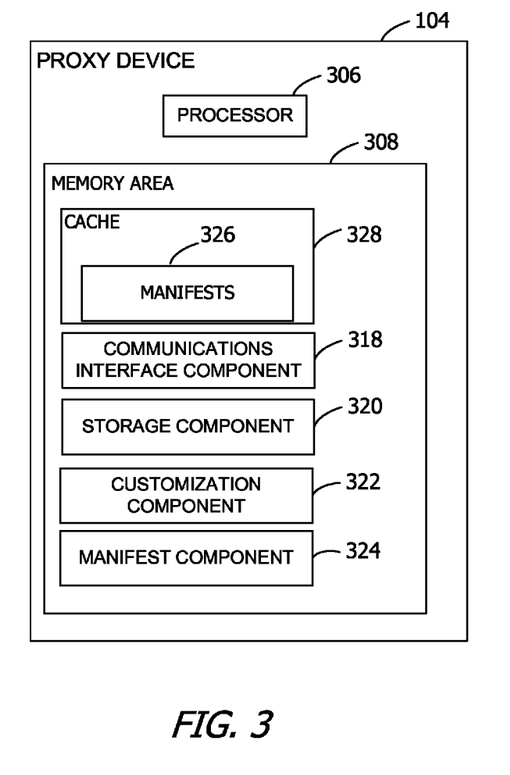
FIG. 3 is an exemplary block diagram illustrating the proxy device storing computer-executable components for building resource packages dynamically.

Referring next to FIG. 3, an exemplary block diagram illustrates the proxy device 104 storing computer-executable components for building resource packages dynamically. The proxy device 104 represents any computing device programmed to perform the operations illustrated in FIG. 4 and FIG. 5. For example, the proxy device 104 may represent a cloud computing device, a server computing device, or another computing device associated with the computing device 102.

The proxy device 104 includes, or has access to, one or more computer-readable media such as a memory area 308. The memory area 308 may be internal or external to the proxy device 104 (not shown) or both (not shown). The memory area 308 stores, in addition to the manifests 326 for one or more web pages, the data identifying web page resources (e.g. content) and locations (e.g. network locations) from which resources may be obtained. For example, the network locations may include the content delivery network 114, the origin sites 116, and/or a cache 328 of the proxy device 104. In some embodiments, the cache 328 stores compressed versions of one or more resources.

The memory area 308 also stores one or more computer-executable components. Exemplary components include a communications interface component 318, a storage component 320, a customization component 322 and a manifest component 324. The communications interface component 318, when executed by at least one processor 306 of the proxy device 104, causes the processor 306 to receive a request for the web page from the computing device 102. In some embodiments, the communications interface component 318 includes a network interface card and/or computer-executable instructions (e.g., a driver) for operating the network interface card. In some embodiments, the communications interface component 318 is operable with near-field communication (NFC) tags.

The storage component 320, when executed by the processor 306 of the proxy device 104, causes the processor 306 to identify the manifest 326 associated with the web page. The manifest 326 identifies resources associated with the web page. The communications interface component 318 of the proxy device 104 causes the processor 306 to send the manifest 326 identified by the storage component 320 to the computing device 102. The communications interface component 318 subsequently receives a modified manifest from the computing device 102. The modified manifest identifies those resources cached by the computing device 102, such as described with reference to FIG. 2.

The customization component 322, when executed by the processor 306 of the proxy device 104, causes the processor 306 to define a single package of resources for the web page. The single package excludes those resources cached by the computing device 102. The communications interface component 318 further executes to send the single package to the computing device 102 for the computing device 102 to render the web page using the single package and using the resources cached by the computing device 102 (or accessed from the content delivery network 114 or the origin sites 116).

The manifest component 324, when executed by the processor 306 of the proxy device 104, causes the processor 306 to create the manifest 326 for the web page based on a page report received from the computing device 102. The page report, received from the computing device 102 for example, identifies the resources associated with the web page. In an example, the manifest component 324 creates the manifest 326 to include the properties of the resources. As another example, the manifest component 324 pre-resolves domain name service (DNS) names associated with the resources.

The manifest component 324 may further execute to intermittently update the manifest 326 based on a frequency of access to the manifest 326 by the computing devices 102. In some embodiments, the manifest component 324 executes out-of-band from the communications interface component 318, the storage component 320, and the customization component 322. The out-of-band execution of the manifest 326 enables the manifest 326 to be updated without introducing latency into the execution of the communications interface component 318, the storage component 320, and the customization component 322. For example, the communications interface component 318, the storage component 320, and the customization component 322 operate on a first communication channel with the computing device 102, and the manifest component 324 operates on a second communication channel.

Figure 4:
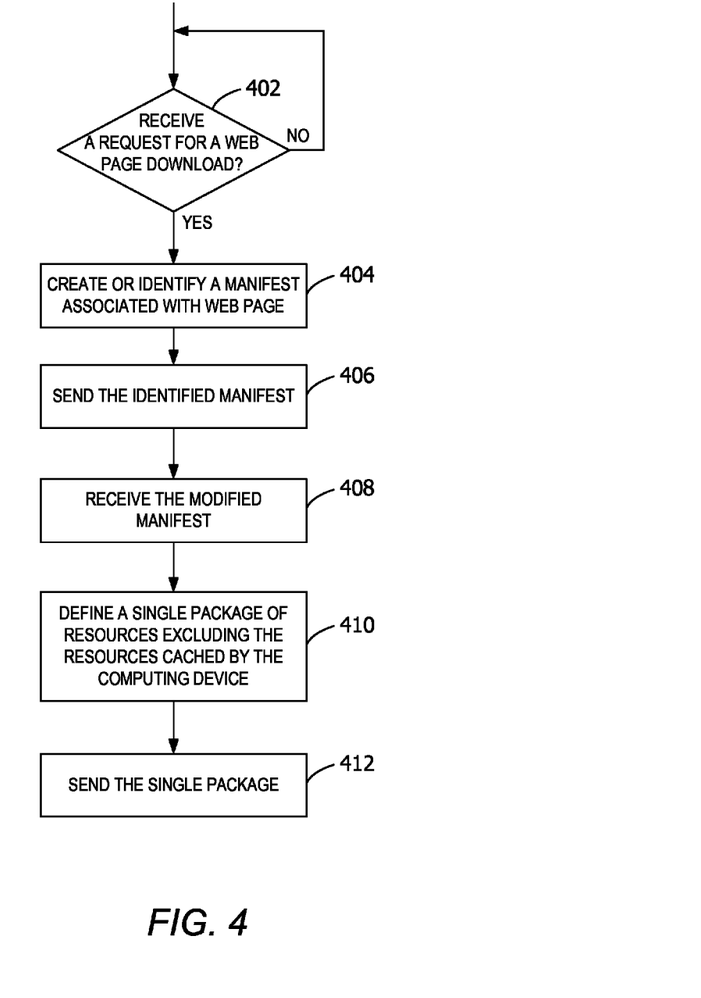
FIG. 4 is an exemplary flow chart illustrating operation of the proxy device to build a single package based on a modified manifest.

Referring next to FIG. 4, a flow chart illustrates operation of the proxy device 104 to build a single package based on the modified manifest. While the operations illustrated in FIG. 4 are described as being performed by the proxy device 104 in some embodiments, the operations may be performed by any other computing entity such as a cloud service or a web service.

The proxy device 104 listens for requests from the computing device 102 for one or more resources at 402. In another exemplary embodiment, the requests from the computing device 102 include information associated with the cached resources 112.

In the example of FIG. 4, in response to receiving a request at 402 for a resource associated with the web page from the computing device 102, the proxy device 104 identifies the manifest 326 associated with the web page at 404 and provides the identified manifest to the computing device 102 at 406. In this example, the proxy device 104 already stores (e.g., in the memory area 308) a previously created manifest for the web page.

In other examples (not shown), in response to receiving a first request for the web page from the computing device 102 (e.g., after determining that the manifest 326 for the web page is not available to the proxy device 104), the proxy device 104 creates the manifest 326 for the web page and provides the created manifest in response to subsequent requests for the web page. For example, the proxy device 104 may communicate with the content delivery network 114, the origin sites 116, and/or other content sources to obtain and catalog each of the resources. The proxy device 104 then defines the manifest 326 for the web page to include an identification of the resources. The defined manifest 326 is stored in the memory area 308 for use in servicing subsequent requests for the web page.

As described with reference to FIG. 2, the computing device 102 modifies the manifest 326 to identify page resources that are stored in the memory area 108 as the cached resources 112.

The modified manifest is received by the proxy device 104 at 408. Based on the modified manifest, the proxy device 104 defines a single package of resources at 410 that exclude the resources already cached by the computing device 102. The single package is dynamically built and customized by the proxy device 104 based on the current state of the computing device 102.

The single package is provided to the computing device 102 at 412 for rendering the web page.

Figure 5:
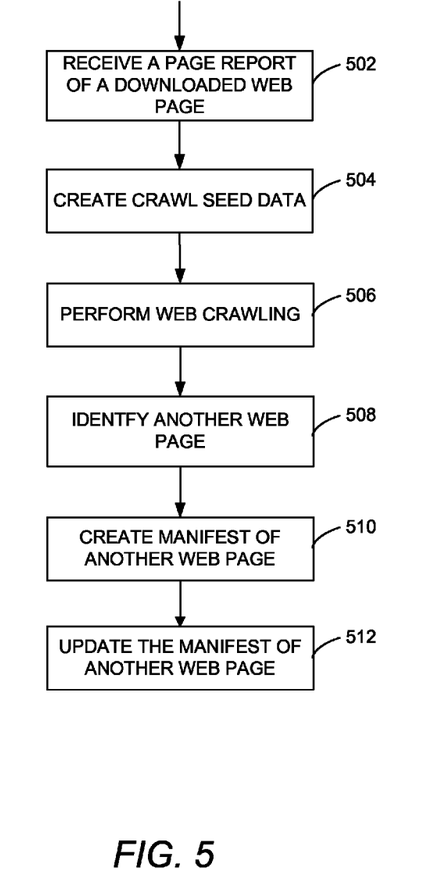
FIG. 5 is an exemplary flow chart illustrating operation of the proxy device to create and update a manifest based on a page report of a downloaded web page.

Referring next to FIG. 5, an exemplary flow chart illustrates operation of the proxy device 104 to create and/or update the manifest 326. While the operations illustrated in FIG. 5 are described as being performed by the proxy device 104 in some embodiments, the operations may be performed by any other computing entity such as a cloud service or a web service.

The proxy device 104 receives a page report describing the web page at 502 from, for example, the computing device 102, a web crawler, or other entity. The page report identifies the resources associated with the web page. At 504, the proxy device 104 derives or otherwise creates crawl seed data from the page report. Web crawling is then performed based on the created seed data at 506. The web crawling based on the crawl seed data identifies at 508 other web pages (and resources) for which manifests may be created or updated, and stored by the proxy device 104. For example, the proxy device 104 creates the manifest 326 for the identified web pages at 510 by identifying the resources associated therewith. The created manifests 326 are then stored in the memory area 308 for use when servicing future requests for the identified web pages. As another example, the proxy device 104 updates at 512 existing manifests 326 based on the information obtained during the web crawling.

Figure 6:
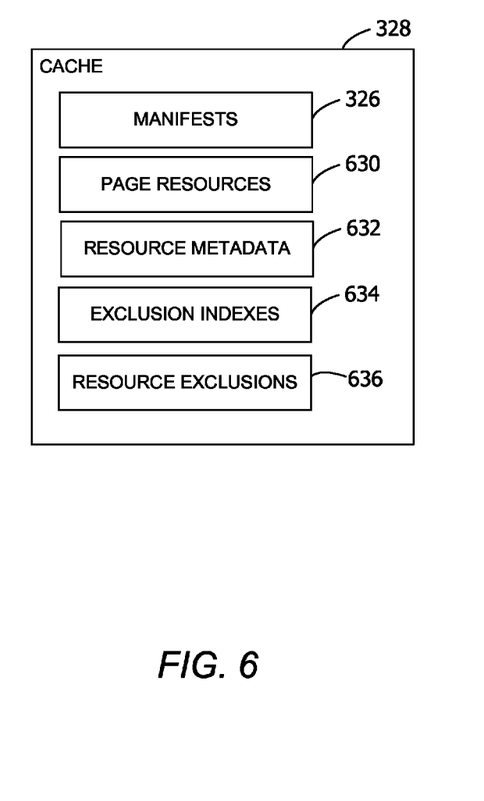
FIG. 6 is an exemplary block diagram illustrating a cache in a memory area of the proxy device.

Referring next to FIG. 6, an exemplary block diagram illustrates the cache 328 in the memory area 308 of the proxy device 104. The exemplary cache 328 includes, but is not limited to, the manifests 326, page resources 630, resource metadata 632, exclusion indexes 634, and resource exclusions 636.

Each manifest 326 identifies the page resources 630 used to render one or more of the web pages. In some examples, the pages resources 630 are retrieved by the proxy device 104 from the content delivery network 114, origin sites 116, and/or other content sources, and are compressed for storage in the cache 328. In other embodiments, the proxy device 104 does not store actual copies of the page resources 630, but rather stores an address to each of the page resources 630. When dynamically creating the customized packages in response to a request from the web page, the proxy device 104 then obtains the page resources 630 via the address.

The resource metadata 632 represent data describing the page resources 630. The resource metadata 632 includes, for example, information indicating that the resource is not compressible, an expiration time of the resource, a version of the resource, headers, a hash of the resource, and/or whether the resource should be included or should not be included in the single package.

In an example, if the resource metadata 632 indicates that the resource has expired then the version of the resource stored in cache is included in the single package. If the resource has an expiration time and if the resource has been modified since the request, the resource is accessed from the content delivery network 114. The expiration time in the resource metadata 632 is also updated. If the resource has no expiration time, the resource is re-fetched from the origin sites 116 and a predefined expiration time is defined for the resource that indicates the time to reuse this resource for another user.

The exclusion indexes 634 represent indices of the resources exclusions 636 in the manifest 326 that are to be excluded from inclusion in the single package. The resource exclusions 636 include one or more properties such as exclusion reason, exclusion time, resource URL and content type.

In one of the examples, the manifest component 324 creates new resource exclusion 636 and defines a reason for exclusion of the resource, a time of the resource exclusion, a URL of the resource, and a content type of the resource for the excluded resource.

In an example scenario, the computing device 102 modifies the manifest 326 by providing information that indicates the resources up to a particular index in the manifest 326 should not be included in the single package. The proxy device 104 then creates the single package that includes the resources that have the index that is higher than the index provided by the computing device 102.

Figure 7:
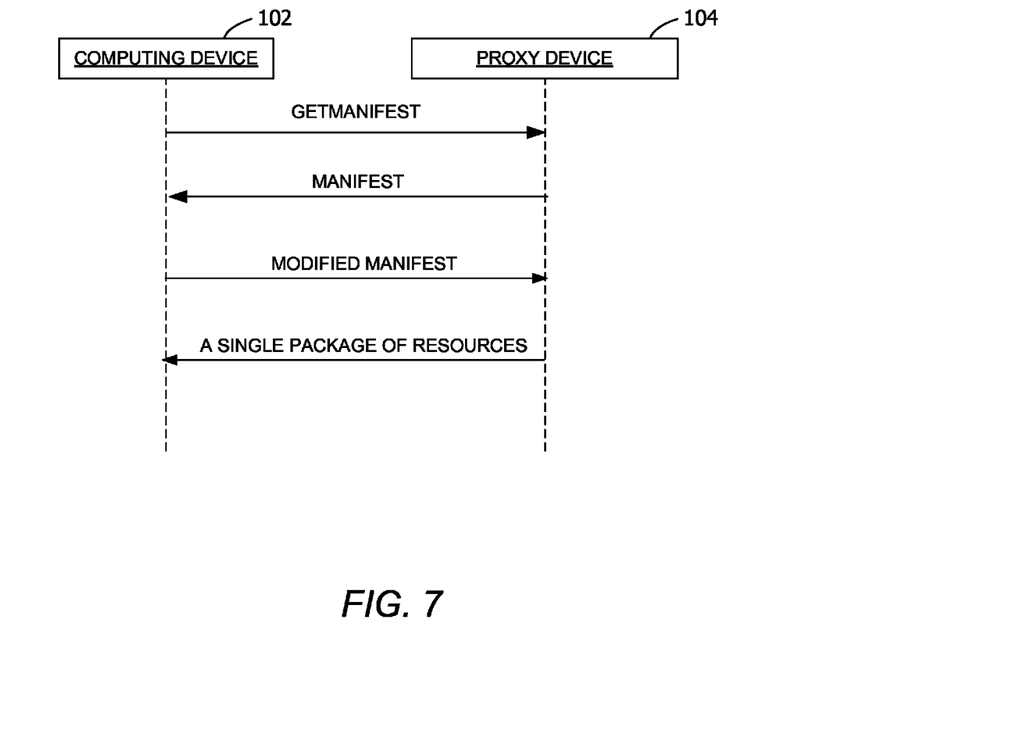
FIG. 7 is an exemplary sequence diagram illustrating downloading of the web page.

Referring next to FIG. 7, an exemplary sequence diagram illustrates downloading of the web page. The computing device 102 (e.g., via a network stack or other component) sends an application programming interface (API) such as a GetManifest (Web Page) call to the proxy device 104. The proxy device 104 searches the memory area 308 for the manifest 326 corresponding to the requested Web Page. If the manifest 326 is found, the proxy device 104 provides the manifest 326 to the user device 102.

The computing device 102 modifies the manifest 326 to identify the page resources that are stored in the memory area 108 as the cached resources 112. The modified manifest is returned to the proxy device 104. For example, the modified manifest is sent along with a GetSingleResource call to the proxy device 104. Before sending the GetSingleResource request, the manifest 326 is evaluated to determine if the request may be sent to the proxy device 104. If no, the resources for the web page are fetched from the origin sites 116.

The proxy device 104 checks the resource metadata 632 in the memory area 308 to determine whether any of the page resources requested in the modified manifest has expired. For example, if the proxy device 104 determines that a particular resource is unchanged or otherwise not expired, then the last version of the resource may be provided up to a predetermined time (e.g. sixty seconds) to the computing device 102.

In other examples, the resource metadata 632 indicates that one or more requested page resources are not present in the memory area 308 of the proxy device 104. The proxy device 104 fetches these page resources from the origin site 116 or the content delivery network 114. The fetched page resources are compressed at the proxy device 104. If the fetched resource is found to be compressible, it is cached in the proxy device 104 and the resource metadata 632 is updated.

The proxy device 104 prepares the single package of resources representing the web page. The single package of resources excludes the identified cached resources 112 stored in the memory area 108. The single package is built dynamically by the proxy device 104 and sent to the computing device 102. The web page is rendered by the computing device 102 after receiving the single package of resources. The computing device 102 renders the web page by using the resources from the single package in combination with the cached resources 112 stored in the memory area 108.

Figure 8:
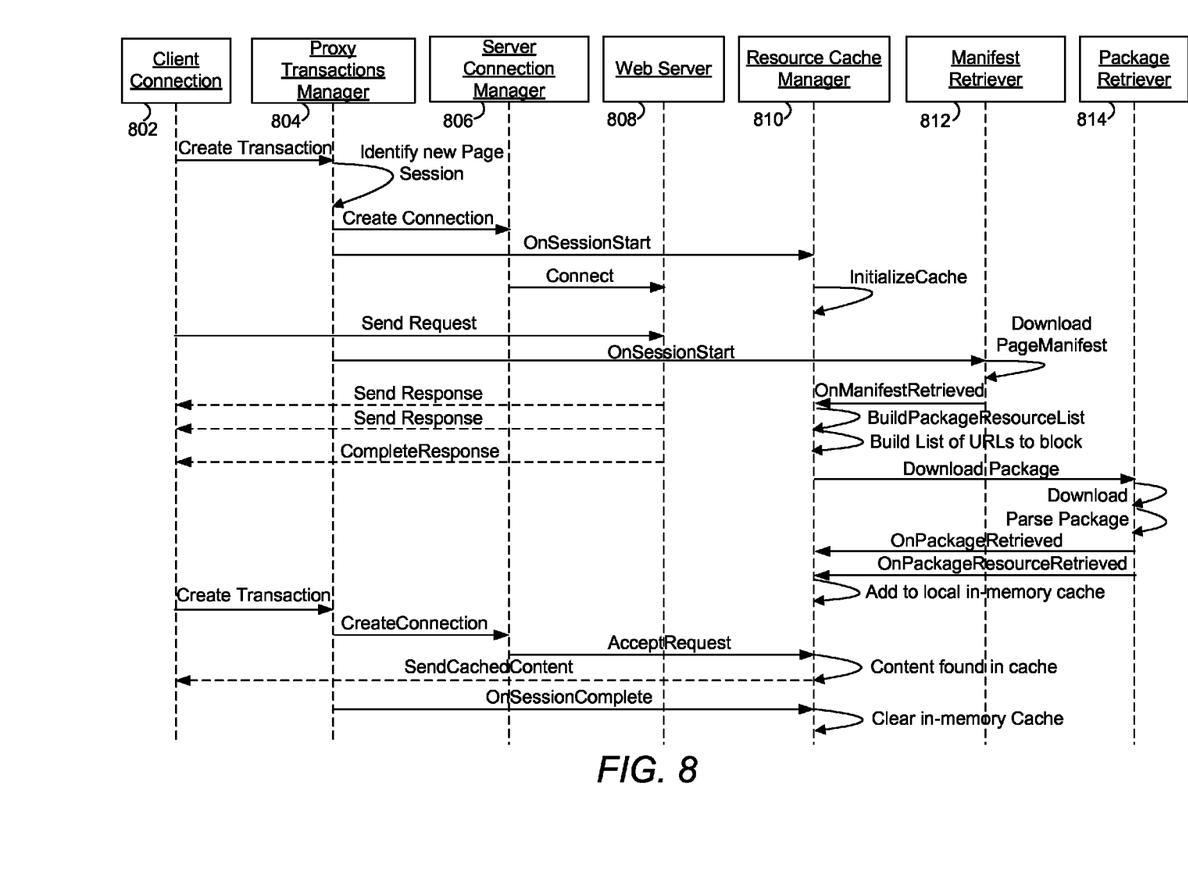
FIG. 8 is an exemplary sequence diagram illustrating a sequence of operations to deliver the single package of resources.

Referring next to FIG. 8, an exemplary sequence diagram illustrates a sequence of operations to deliver the single package of resources. The user initiates a browsing session and requests for the web page (not shown). A client connection component 802 of the computing device 102 receives the request and creates a transaction instance. A proxy transactions manager 804 of the computing device 102 identifies the start of the new page session. The proxy transactions manager 804 creates a new page session tracker instance and inserts the transaction instance into the session tracker instance. The proxy transactions manager 804 establishes a connection with a server connection manager 806. The server connection manager 806 then establishes a connection with a web server 808.

The proxy transactions manager 804 further on start of the new page session connects to a resource cache manager 810. The resource cache manager 810 initializes its cache. In some examples, the client connection component 802 sends a request for resources to the web server 808 in parallel. The web server 808 provides the requested resources to the client connection component 802 and completes the response by providing all the requested resources. The client connection component 802 receives the requested resources from the web server 808 and forwards them to the browser for rendering the web page. The proxy transactions manger 804 updates the page session tracker instance based upon the received resources. In some examples, the request for resources to the web server 808 is sent when the resource cache manager 810 does not have any cached resource corresponding to the requested resources.

The proxy transactions manager 804 initiates a page manifest download request to manifest retriever 812. The manifest retriever 812 sends the request to the proxy device 104. The manifest retriever 812 receives, in parallel, the response from the proxy device 104. The resource cache manager 810 parses the manifest, and builds a list of resources associated with the current web page session. The resource cache manager 810 browses a list of the cached resources 112 and builds a list of resources to download from the proxy device 104 in the form of a single package. The list of resources to download is built by identifying the resources, from the manifest resource list, that are not cached on the computing device 102.

The resource cache manager 810 builds a package request and sends the request to the package retriever 814. The package retriever 814 receives a resource package from the proxy device 104 and parses the resource package. The resource cache manager 810 receives the parsed retrieved package, extracts the resources of the package, and caches the resources.

The browser receives the response from the resource cache manager 810 corresponding to the request for the web page and issues one or more additional manifest/resource requests concurrently. The client connection component 802 receives the request, parses the request, identifies the page session identifier, inserts transactions into a matching session tracker instance and initiates a process to build a response for the request.

The client connection component 802 receives a final request for a current page session. The resource cache manager 810 completes the response to the final session request, closes the page tracker instance, clears the cache, creates a report for the completed page tracker instance, and uploads the report to the proxy device 104.

Additional Examples

In some embodiments, the proxy device 104 maintains different versions of the manifest 326 and each individual manifest version contains information about state of resources stored at the respective location and version of the web page last seen by a user. The different versions of the manifests 326 allow efficient refreshing of the cached resources 112 at the computing device 102. For example, a latest version of the manifest 326 may indicate a latest version of the web page. When the latest version of the manifest 326 is provided to the computing device 102 and the computing device 102 has cached resources 112 associated with older version of the web page, then the computing device 102 modifies the manifest 326 to indicate that the page resources associated with the newer version of the web page are to be provided to the computing device 102. The page resources associated with the newer version of the web page results in the efficient refreshing of the cached resources 112.

In some embodiments, the modified manifest 326 allows the proxy device 104 to determine which resources to send and when to send the resources to the computing device 102. For example, the modified manifest 326 provides information representing a sequence or order in which the resources are to be sent to the computing device 102. The proxy device 104 discovers the page resources not stored in the cache 328 and fetches these pages resources from the origin sites 116 to render the web page.

In another example scenario, the resource is provided to the computing device 102 from the proxy device on the GetSingleResource call. The exclusion time of the resource exclusions 636 is compared with a pre-defined threshold time. If exclusion time is equal to pre-defined threshold time, then there have been no exclusions for the web page performed and the resource included is in compressed form. If the exclusion time is not equal to the pre-defined threshold time, the exclusion indexes 634 are obtained for the web page from the cache 328.

In exemplary embodiments, the proxy device 104 performs batch job processing periodically for creating new manifests based on number of requests received from a plurality of the computing devices 102.

At least a portion of the functionality of the various elements in FIG. 1, FIG. 3, and FIG. 6 may be performed by other elements in these figures, or an entity (e.g., processor, web service, server, application program, computing device, etc.) not shown in these figures.

In some embodiments, the operations illustrated in FIG. 2, FIG. 4 and FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, touch input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for optimizing web page downloads through a customized manifest in one content response using one connection to one endpoint in a web service.

The embodiments illustrated and described herein as well as embodiments not specifically described herein but within the scope of aspects of the invention constitute exemplary means for downloading the web page with a single hypertext transfer protocol (HTTP) response to a single HTTP request.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that the matter contained in the above description and shown in the accompanying drawings shall be interpreted as illustrative and not in a limiting sense.

APPENDIX A

The following is an example of a package in MIME format.

```
MIME-Version: 1.0
Content-type: multipart/mixed; boundary="=boundary_string_1"
Content-transfer-encoding: binary
X-Miss: abcd5678, 098765aa
--=boundary_string_1
Content-Type: x-multipart/deflate
Content-transfer-encoding: binary
MIME-Version: 1.0
X-Comment: Image this is compressed using deflate.
Content-type: multipart/mixed; boundary="=boundary_string_2"
--=boundary_string_2
Content-Type: text/css; charset="utf8"
X-Hash: 435267aa
Content-transfer-encoding: 8bit
Http-Header-Name-1: HttpHeaderValue-1
Http-Header-Name-2: HttpHeaderValue-2
Http-Header-Name-3: HttpHeaderValue-3
Some cascading style sheets (CSS) goes here.
--=boundary_string_2
Content-Type: application/javascript; charset="utf8"
X-Hash: 43526789
Content-transfer-encoding: 8bit
Http-Header-Name-1: HttpHeaderValue-1
Http-Header-Name-2: HttpHeaderValue-2
Http-Header-Name-3: HttpHeaderValue-3
--=boundary_string_2--
--=boundary_string_1
Content-Type: image/jpeg
Content-transfer-encoding: binary
X-Hash: 192837cc
Some image data goes here.
--=boundary_string_1--
```

What is claimed is:

1. A system for optimizing web page downloads through a customized manifest, said system comprising:
   a memory area associated with a mobile computing device, said memory area storing one or more cached resources associated with one or more web pages; and
   a processor programmed to:
      send a request to a proxy device for at least one web page;
      receive, from the proxy device, a pre-defined manifest for the at least one web page, the manifest identifying page resources associated with the at least one web page;
      compare the cached resources stored in the memory area to the page resources;
      modify the pre-defined manifest to identify the page resources that are stored in the memory area as the cached resources;
      send the modified manifest to the proxy device;
      receive, from the proxy device, a single package of resources representing the at least one web page, the single package of resources excluding the identified page resources stored in the memory area as the cached resources; and
      render the at least one web page using the received single package of resources in combination with the identified page resources stored in the memory area.

2. The system of claim 1, wherein the processor is further programmed to:
   download a web page for which no manifest is defined on the proxy device;
   generate a page report for the downloaded web page, the page report identifying the resources associated with the downloaded web page; and
   send the generated page report to the proxy device, the proxy device creating a manifest for the downloaded web page from the generated page report.

3. The system of claim 1, further comprising identifying one or more resources for the one or more web pages to cache in the memory area.

4. The system of claim 1, wherein the processor is programmed to send the modified manifest to the proxy device by sending a single hypertext transfer protocol (HTTP) request for the at least one web page.

5. The system of claim 1, further comprising means for optimizing web page downloads through a customized manifest in one content response using one connection to one endpoint in a web service.

6. The system of claim 1, further comprising means for downloading a web page with a single hypertext transfer protocol (HTTP) response to a single HTTP request.

7. A method comprising:
   receiving, by a computing device, a manifest for at least one web page from a proxy device, the manifest identifying resources associated with the at least one web page;
   modifying, by the computing device, the received manifest to identify those resources associated with the at least one web page that are cached by the computing device;
   sending the modified manifest to the proxy device;
   receiving, by the computing device from the proxy device, a single package of resources representing the at least one web page, the single package excluding the identified resources, associated with the at least one web page, that are cached by the computing device; and
   rendering the at least one web page using the received single package in conjunction with the identified resources, associated with the at least one web page, that are cached by the computing device.

8. The method of claim 7, further comprising sending, by the computing device, a request for the at least one web page.

9. The method of claim 7, wherein modifying the received manifest comprises tagging those resources associated with the at least one web page that are cached by the computing device.

10. The method of claim 7, wherein modifying the received manifest comprises removing those resources associated with the at least one web page that are cached by the computing device.

11. The method of claim 7, further comprising identifying those resources associated with the at least one web page that are cached by the computing device.

12. The method of claim 11, wherein identifying those resources associated with the at least one web page that are cached by the computing device comprises comparing timestamps, from the manifest, of the resources associated with the at least one web page with timestamps, from the computing device, of the resources as cached by the computing device.

13. The method of claim 11, wherein identifying those resources associated with the at least one web page that are cached by the computing device comprises comparing identifiers, from the manifest, of the resources associated with the at least one web page with identifiers, from the computing device, of the resources as cached by the computing device.

14. One or more computer storage media embodying computer-executable components, said components comprising:
   a communications interface component that when executed causes at least one processor to receive a request for a web page from a user computing device;
   a storage component that when executed causes at least one processor to identify a manifest associated with the web page, the manifest identifying resources associated with the web page,
   the communications interface component further sending the identified manifest to the user computing device and subsequently receiving a modified manifest from the user computing device, the modified manifest identifying those resources cached by the user computing device; and
   a customization component that when executed causes at least one processor to define a single package of resources for the web page, the single package excluding those resources cached by the user computing device,
   the communications interface component further sending the single package to the user computing device for rendering the web page on the user computing device using the single package and using the resources cached by the user computing device.

15. The computer storage media of claim 14, further comprising a manifest component that when executed causes at least one processor to create the manifest for the web page based on a page report received from the user computing device, the page report identifying the resources associated with the web page.

16. The computer storage media of claim 15, the manifest component further intermittently updating the manifest based on a frequency of access to the manifest by the user computing device.

17. The computer storage media of claim 15, wherein the manifest component further creates the manifest to include properties of the resources.

18. The computer storage media of claim 15, wherein the manifest component communicates on a first communication channel, and the communications interface component, the storage component, and the customization component communicate on a second communication channel.

19. The computer storage media of claim 15, wherein the manifest component pre-resolves domain name service (DNS) names associated with the resources.

20. The computer storage media of claim 15, wherein the manifest component further:
   creates crawl seed data from the page report;
   performs web crawling based on the created crawl seed data to identify another web page; and
   creates a manifest for the identified another web page.

* * * * *